United States Patent [19]

Joffe

[11] 4,454,477
[45] Jun. 12, 1984

[54] LOOP CURRENT DETECTOR WITH THRESHOLD SETTING IMPEDANCE

[75] Inventor: Daniel M. Joffe, Parsippany, N.J.

[73] Assignee: AT&T Bell Laboratories, Murray Hill, N.J.

[21] Appl. No.: 372,741

[22] Filed: Apr. 28, 1982

[51] Int. Cl.³ ............................................. H04M 3/22
[52] U.S. Cl. ................................. 328/149; 179/18 FA
[58] Field of Search ........................ 179/18 FA, 16 F; 328/150, 208, 147, 149

[56] References Cited

U.S. PATENT DOCUMENTS

| | | | |
|---|---|---|---|
| 3,622,709 | 11/1971 | Tjaden | 179/18 F |
| 3,748,395 | 7/1973 | Herter | 179/18 FA |
| 3,784,756 | 1/1974 | Nemchik | 179/16 F |
| 4,056,688 | 11/1977 | Stiefel | 179/16 F |
| 4,292,473 | 9/1981 | Venken et al. | 179/18 FA |
| 4,315,106 | 2/1982 | Chea, Jr. | 179/16 F |
| 4,387,273 | 6/1983 | Chea, Jr. | 179/16 F |
| 4,406,929 | 9/1983 | Pace et al. | 179/170 NC |

Primary Examiner—Thomas W. Brown
Attorney, Agent, or Firm—C. S. Phelan

[57] ABSTRACT

In a loop circuit closure detector, a circuit which connects a voltage comparator to the loop circuit is biased so that the comparator indicates loop circuit closure at a predetermined minimum non-zero value of loop current. Comparator inputs are both coupled to supply voltage connections by approximately equal-attenuation paths and are both coupled to said loop circuit by approximately equal-attenuation paths.

12 Claims, 1 Drawing Figure

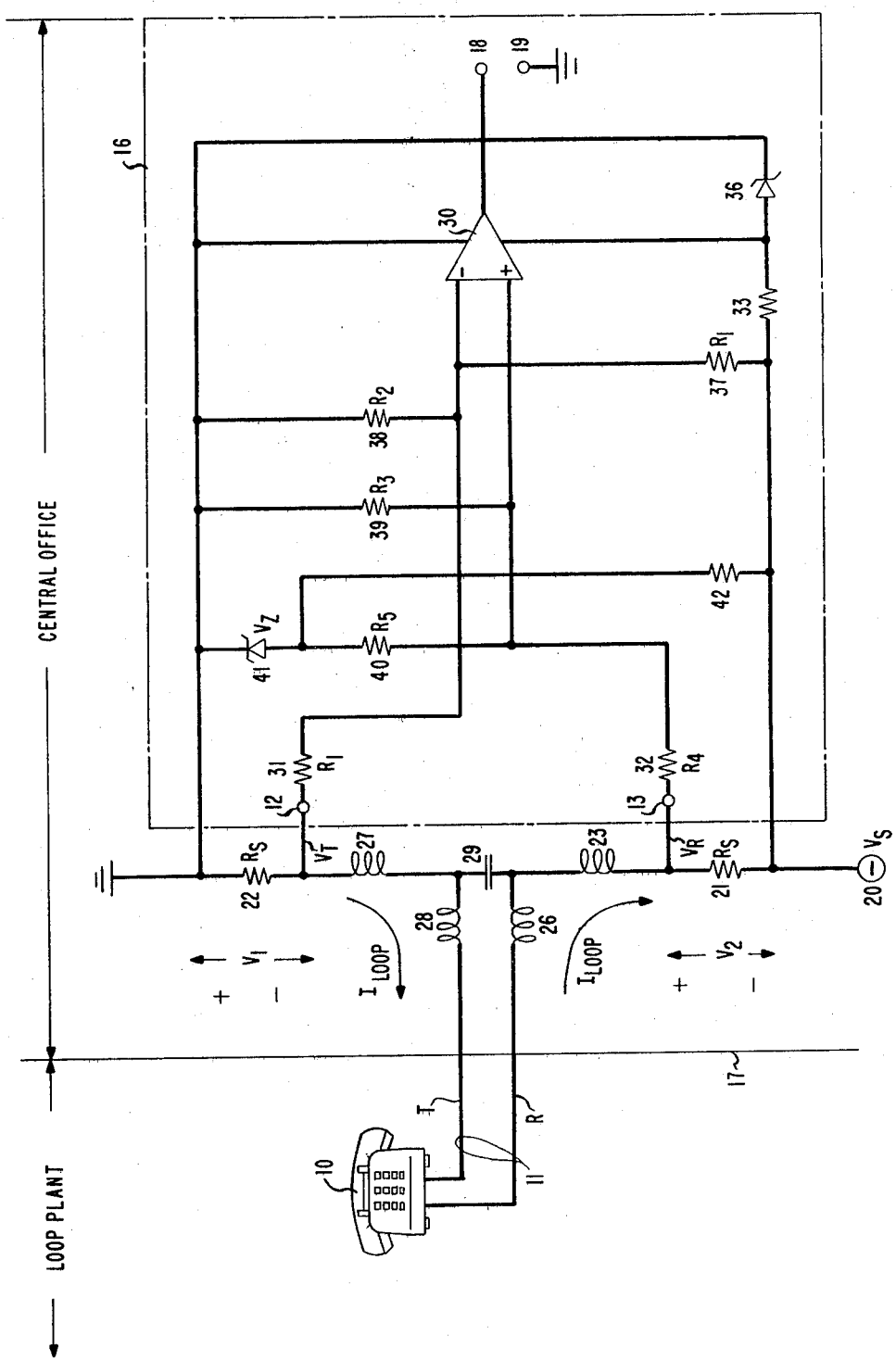

LOOP CURRENT DETECTOR WITH THRESHOLD SETTING IMPEDANCE

BACKGROUND OF THE INVENTION

This invention relates to a loop circuit current level detector, and it relates more particularly to such a detector which operates relatively independently of supply voltage variations within a predetermined voltage range.

It is known in loop circuit monitoring arrangements to use impedance bridge-type circuits with a difference amplifier-type voltage comparator across one bridge diagonal to detect loop circuit closure status. Supply voltage for both the comparator and a loop circuit being monitored is connected across another diagonal of the bridge circuit. Examples of this type of circuit are found in the U.S. Pat. No. 3,622,709 to G. S. Tjaden and U.S. Pat. No. 4,056,688 to K. E. Stiefel. A loop current detector using an unbalanced signal amplifier is shown in the U.S. Pat. No. 3,784,756 to J. M. Nemchik.

A modified voltage difference detecting arrangement is shown in a U.S. Pat. No. 3,748,395 to E. Herter and wherein a diode is connected across one diagonal of a bridge circuit and in a separate series alternating current interrogation circuit which enables a determination of the level of direct current conduction in the diode.

All of the foregoing circuits are either relatively inconvenient to use, e.g., because a separate interrogation circuit is required, or operated with a dependence upon the magnitude of a supply voltage for the detector and for a loop circuit which is being monitored.

SUMMARY OF THE INVENTION

The foregoing difficulties of the prior art are at least partially reduced by including, in association with a coupling network coupling a pair of terminals to receive current responsive signals from a circuit which is being monitored, a biasing arrangement which causes a predetermined terminal signal to indicate a predetermined minimum monitored current level regardless of the magnitude of the supply voltage.

In one embodiment of the invention, the coupling network is a resistance bridge-type of circuit that couples a telephone subscriber loop circuit through the terminals to a comparator. The network has associated therewith a reverse breakdown diode current which enables the operation of the comparator in response to a non-zero loop current level without the requirement for imposition of a bias which is dependent upon supply voltage magnitude.

BRIEF DESCRIPTION OF THE DRAWING

A more complete understanding of the invention and various features, objects, and advantages thereof may be obtained from a consideration of the following Detailed Description and the appended claims in connection with the attached drawing illustrating an embodiment of the invention in connection with a telephone system subscriber loop circuit.

DETAILED DESCRIPTION

In the drawing, a subscriber station set 10 is connected through a subscriber loop circuit 11, including a tip lead T and a ring lead R, to transmission transformer windings 26 and 28, and from there to a midpoint capacitor 29 and to simplex inductors 23 and 27. Sensing resistors 21 and 22 (also each designated $R_s$) connect those inductors to a negative supply 20 and to ground, respectively. This is one line interface arrangement well known in the art for separating voice frequency information ad signaling currents. Windings 26 and 28 serve as the primary winding of a line circuit transformer for coupling loop circuit 11 voice signals by way of an additional winding (not shown) to the central office switch in the usual manner. Subscriber loop current $I_{Loop}$ flows counterclockwise, as indicated by arrows adjacent to the loop circuit 11 in the drawing.

Terminals 12 and 13 of a circuit 16 for detecting the operational state of the loop circuit 11 are connected to the sensing resistors. If the subscriber station set 10 is in the off-hook state, loop circuit 11 is electrically closed; and, if the station set is in the on-hook, or nonworking state, the loop circuit 11 is in the electrical open circuit state.

The detecting circuit 16 is advantageously in a remote location (with respect to station 10) such as in a telephone system central office or private branch exchange serving the subscriber location equipment such as station set 10. For purposes of illustration, the station set central office combination is shown; and that office advantageously serves other subscriber stations connected by loop circuits (not shown), as well as trunk circuits (not shown) extending to other offices in the public switched telephone network. The central office also includes a switch for interconnecting the various lines and trunks connected to the office for forming communication signal paths, as well as associated control arrangements and supervisory and control signal sources which are well known in the art and, therefore, not shown in the drawing. A vertical line 17 in the drawing schematically represents a division between the central office and the associated loop plant which includes the various subscriber loop circuits. Output terminals 18 and 19 are provided for the detecting circuit 16 and are available for connection to appropriate portions of the central office equipment for indicating thereto the operational state of a particular subscriber loop circuit to which the detecting arrangement is coupled. Detecting circuit 16 is advantageously part of a line circuit utilized for coupling a subscriber line of the loop plant to the central office circuits. Consequently, one such line circuit, with its individual detecting circuit 16, is provided for each such line circuit; and circuit 16 is, therefore, powered from supply 20.

Subscriber loop circuits, such as the circuit 11, typically vary considerably in terms of factors such as circuit length, electrical resistance, distributed impedance, and susceptibility for receiving leakage currents from various sources. It has been found that, in subscriber loop circuits which can be typically adequately served by a loop current of approximately 16 milliamperes (ma.), a current of about 12 ma. is the minimum which will reliably indicate the abovementioned loop closure state for the longest loop circuit and the maximum possible office battery terminal variation from a predetermined nominal value.

The negative supply 20 is the central office talking battery and is schematically represented by a circled negative sign to represent electrical connection to a terminal of corresponding polarity of an appropriate direct current supply which has its terminal of opposite polarity connected to ground. This supply is otherwise schematically designated by the terminal voltage symbol $V_s$. Batteries of different voltages are often utilized in different central offices and sometimes within a single central office. Two frequently used battery voltages in telephone systems are −48 volts and −72 volts. The detecting circuit 16 described herein is advantageously useful, when supplied by either of those voltages, and does not require detecting circuit adjustment when that circuit, in its coupling line unit, is changed from a system using one of those voltages to a system using the other voltage.

The battery current feed path for a line circuit, such as the circuit 11, includes the pair of line current sensing resistors 21 and 22 which are otherwise both indicated by the reference character $R_s$ to indicate that they have approximately equal resistances. The use of dual reference characters for resistors 21 and 22, and for other resistors in a coupling network portion, to be described, of circuit 16, lends convenience to consideration of the circuit. Arabic numerals are convenient for purposes of circuit description, and subscripted letters R are convenient for analyzing electrical relationships in the circuit 16.

Detecting circuit 16 includes a comparator 30 such as a 741-type operational amplifier. The inverting and noninverting inputs of comparator 30 are coupled to the line feed path at the ends of the resistors 21 and 22 which are remote from the respective terminals of the supply 20. These connections are achieved through resistors 31 and 32 which are otherwise designated $R_1$ and $R_4$, respectively. Resistors 31 and 32 are advantageously of approximately the same electrical resistance, and they have a much higher resistance than resistors 21 and 22. Accordingly, the comparator 30 is able to sense voltage changes in the line circuit 11 with good longitudinal signal rejection, and without diverting significant signal energy from the loop circuit. In this way, detecting circuit 16 senses the difference between a voltage with respect to ground $V_R$ at the terminal of resistor 32 which is common with resistor 21 and a voltage with respect to ground $V_T$ at the terminal of resistor 31 which is common to resistor 22.

A negative power supply voltage for comparator 30 is connected to a tap on a series voltage divider impedance including a resistor 33 connected to the supply 20, and a reverse breakdown diode 36, which is also connected to ground. This fixes the supply for comparator at approximately, for example, 24 volts for the type-741 amplifier previously mentioned for any of the office supply voltages likely to be used for supply 20.

Two additional voltage dividers are connected across the supply 20 to comprise a resistance bridge. One of these includes resistors 37 and 38, otherwise designated $R_1$ and $R_2$, and it has the common tap between those resistors connected to the inverting input of comparator 30. The second voltage divider includes the sensing resistor 21, the resistor 32, and a resistor 39, otherwise designated $R_3$, all connected in series in the order named. The common terminal between resistors 32 and 39 is connected to the noninverting input of amplifier 30.

The aforementioned connections from the voltage dividers to the comparator inverting and noninverting inputs are provided to present essentially equal attenuation paths from the supply voltage $V_s$ negative and ground terminals to each of those inputs of the comparator. Consequently, a change in the magnitude of the $V_s$ terminal voltage, e.g., if the detecting circuit 16 is moved from a system utilizing a first supply voltage to a system utilizing a second supply voltage, has no substantial effect on the threshold voltage difference between those comparator input connections at which the sign of the difference between the voltages changes. It is a characteristic of comparators, such as the comparator 30, that its output remains substantially constant at a first level for input voltage differences of a first polarity; but once that polarity difference reverses, the amplifier output steps to a second level.

As described so far, the comparator 30 produces the mentioned output voltage step in response to current in loop circuit 11 at a threshold value of about zero because of the balanced resistance bridge paths to the comparator inputs. Consequently, in order to avoid responses to spurious loops currents prior to loop closure, it would be necessary to choose coupling network impedance between loop circuit 11 and comparator 30 to be unbalanced in some way. Such imbalance required that a predetermined minimum line current must flow in the longest one of the loop circuits, such as 11, served by that talking battery supply 20 in order to indicate assuredly that any of the loop circuits is closed. However, if such an unbalanced detecting circuit 16 were moved between equipment racks using different $V_s$ values, it was heretofore necessary to readjust the network resistance balance in order to correct the loop circuit closure current detection threshold for such new value of $V_s$. If such a readjustment were not made and, for example, a detecting circuit that was set to operate with a $V_s$ of −48 volts were moved, without adjustment, to a connection requiring operation with a $V_s$ of −72 volts, the detecting circuit would never show loop closure for some other longer loops served by the latter supply voltage.

In order to reduce the inconvenience of readjusting the detecting circuit 16 in the event of such a change in supply voltage assignment, it has been found that the coupling network between the loop circuit 11 and the amplifier 30 input can be biased to establish the necessary offset voltage to enable detection of a desired threshold current. With this bias in place, other resistors of the coupling network are advantageously assigned resistance values so that the present equal attenuation paths between the supply $V_s$ and the comparator amplifier 30 inputs. In the illustrative embodiment, the offset bias for the coupling network is implemented by connecting the noninverting input connection of amplifier 30 to ground through a series connected combination of a resistor 40, otherwise also designated $R_5$, and a reverse breakdown diode 41. The diode is poled for reverse conduction from ground toward the resistor 40 and the noninverting input of amplifier 30. Thus, it is normally biased on in reverse conduction when the supply voltage $V_s$ is applied to the line unit. An additional resistor 42 is advantageously connected between the anode of diode 41 and the negative supply 20 to assure sufficient current in the diode to maintain conduction during all detector operation, regardless of anticipated signal current variations in loop circuit 11.

The effect of having the diode 41 connected as outlined is to impose a bias $V_z$ on the aforementioned resistance bridge coupling network. Diode 41 is advantageously selected, as will be subsequently described in greater detail, to cause an unbalanced voltage condition in the coupling network without having to impose such a condition by creating an imbalance among resistances in the aforementioned attenuation paths. Diode 41 in reverse conduction is a zero impedance element compared to the value of the associated resistors. Resistor 40 is chosen, along with resistances of resistors 31, 32, 39, 38, and 37, to preserve the equality of attenuation of the supply voltage $V_s$ at the comparator inputs. A result of this arrangement is that upon the occurrence of closure in the loop circuit 11, the loop current $I_{Loop}$ in resistors 21 and 22 must develop a sufficient voltage drop across those resistors to overcome the offset bias voltage applied by way of diode 41. By overcoming the offset bias, a sufficient voltage imbalance is produced in the resistance bridge to reverse the polarity of the input voltage difference for comparator 30.

The following analysis of the illustrative circuit demonstrates one way in which to establish the values for the various resistances illustrated and thereby produce loop closure detection at a predetermined loop current threshold $I_{TH}$ without unbalancing impedance relationships in the comparator coupling network.

It can be shown by a nodal analysis of the coupling network that the difference between the voltages with respect to ground at the noninverting (+) and inverting (−) terminals of the comparator is:

$$V^+ - V^- = \frac{\frac{V_R}{R_4}}{\frac{1}{R_3} + \frac{1}{R_4} + \frac{1}{R_5}} + \frac{-V_T R_2}{2R_2 + R_1} + \frac{-V_s R_2}{2R_2 + R_1} + \frac{\frac{V_z}{R_5}}{\frac{1}{R_3} + \frac{1}{R_4} + \frac{1}{R_5}} \quad (1)$$

Notice the sum of the sensing resistor voltage magnitudes, marked $V_1$ and $V_2$, is a loop-current-proportional signal with cancellation of longitudinal current components.

Taking the loop equation for loop 11 and the current feed path, $$V_1 + V_2 = V_R - V_T - V_S. \quad (2)$$

Comparing equations (1) and (2), there is found a $V_R - V_T - V_S = (V_1 + V_2)$ term in both, provided that the absolute values of the coefficients of $V_T$ and $V_R$ in equation (1) are set equal to a constant k:

$$\frac{R_2}{2R_2 + R_1} = \frac{\frac{1}{R_4}}{\frac{1}{R_3} + \frac{1}{R_4} + \frac{1}{R_5}} = k. \quad (3)$$

Such an equality is one representation of a condition of equal attenuation, or transfer functions, for loop signals coupled to inputs of comparator 30. That equality assures cancellation of loop longitudinal signals.

Using the foregoing three equations, replacing $V_R - V_T - V_S$ by $V_{Thresh}$, and letting $V^+ - V^- = 0$, yields the following loop current threshold equation:

$$V_{Thresh} = I_{Loop(Thresh)} 2R_s = \frac{\frac{-V_z}{kR_5}}{\frac{1}{R_3} + \frac{1}{R_4} + \frac{1}{R_5}}. \quad (4)$$

Equation (4) assumes that $V_z$ has a finite negative value, and that $I_{Loop(Thresh)}$ has a finite positive value.

Four considerations are taken into account for components selections:

(a) k is chosen to be equal to or less than the ratio of the common mode range of the comparator 30 divided by the sum $V_T + V_S$, where that range is an average of maximum V− and maximum V+ where neither exceeds the comparator supply voltage.

$$k < \frac{V^-}{(V_T + V_S)} \bigg|_{\text{Worst Case}} \approx < \frac{20}{80}. \quad (5)$$

Leaving some margin, k is advantageously chosen k=0.2, though an even smaller k might be safer, i.e., less likely to allow V− and V+ to get out of the comparator common mode range. (Note: 0<k<1)

(b) $R_5$ is an independent variable chosen, e.g., 105 kilohms, to provide an overall impedance level which will not load the sensed voltage. $R_3$ and $R_4$ may be determined from the chosen values of $R_5$ and k, equation (3), and equation (4) by solving equation (3) for $(1/R_3) + (1/R_4) + (1/R_5)$ and substituting in equation (4) to produce:

$$R_4 = \frac{-V_{Thresh}}{V_z} R_5. \quad (6)$$

and then substituting equation (6) into equation (4) and solving for $R_3$:

$$R_3 = \frac{R_5}{\left(k - \frac{1}{k}\right) \frac{V_z}{V_{Thresh}} - 1}. \quad (7)$$

Recalling that $V_{Thresh} = I_{Loop(Thresh)} 2R_s$, set $V_{Thresh} = 12$ ma.$\times 120\Omega \times 2 = 2.88$ volts. The value selected for $R_s$ is large enough for the detector to operate, but small enough so that it does not decrease the range of subscriber loop resistances that can be served. $V_z$ is advantageously chosen as 5 volts to take advantage of an 808CG 2% tolerance zener diode. This yields from equations (6) and (7):

$$R_4 = \frac{-2.88}{-5} R_5 = .576 R_5. \quad (8)$$

$$R_3 = \frac{1}{\left(\frac{.2-1}{.2}\right)\left(\frac{-5}{2.88}\right) - 1} R_5 = .1682 R_5. \quad (9)$$

From the foregoing, ideal values of $R_4$ and $R_3$ and corresponding close commercially available discrete resistor values are:

| Ideal | Close Value |
|---|---|
| $R_4$ = 60.48 | 61.9k |
| $R_3$ = 17.66k | 17.8k |

(c) In order not to impair balance, the following constraint is advantageously imposed:

$$R_4 + R_3 \| R_5 = R_1 + R_1 \| R_2 = \frac{R_1}{1-k}. \quad (10)$$

However, in many applications, the constraint is not critical as $R_4+R_3|R_5$ appears in parallel with 120Ω.

The foregoing relationship of equation (10) is developed by recalling from equation (3) that:

$$k = \frac{R_2}{2R_2 + R_1}. \quad (11)$$

Solving that for each of $R_1$ and $R_2$ in terms of the other and k yields:

$$R_1 = \frac{R_2(1-2k)}{k}. \quad (12)$$

$$R_2 = \frac{kR_1}{1-2k}. \quad (13)$$

Forming an expression for $R_1$ in parallel with $R_2$ using the above and reducing it produces:

$$R_1 \| R_2 = \frac{R_1 k}{1-k}. \quad (14)$$

Then adding $R_1$ yields:

$$R_1 + R_1 \| R_2 = \frac{R_1}{1-k} = R_4 + R_3 \| R_5. \quad (15)$$

Using the closest values shown above yields:

$$(R_4+R_3|R_5)(1-k)=R_1=61.69k. \text{ (ideal)} \quad (16)$$

and 61.9k is chosen as the closest value.

(d) Recalculating k using the closest-value resistances just determined produces:

$$k = \frac{\frac{1}{R_4}}{\frac{1}{R_3}+\frac{1}{R_4}+\frac{1}{R_5}} = 0.197353. \quad (17)$$

Now $R_2$ can be determined from the expression just derived and the closest-value $R_1$ resistance as follows:

$$R_2 = \frac{R_1 k}{1-2k} = .3260448 R_1. \quad (18)$$

$$R_2 = 20.182 k\Omega. \quad (19)$$

A close discrete component value is 20.0kΩ+174Ω.

If the discrete component choices for resistors are applied in equation (1), the comparator input voltage difference becomes:

$$V^+ - V^- = V_R 0.197353 - (V_T + V_S) 0.1973046 - 5 \times 0.116344. \quad (20)$$

The threshold voltage at which the comparator input changes polarity is then $V_{Thresh} \approx 2.948$. A value of 2.88 was originally desired. The new value results in $$I_{Loop(Thresh)} \approx 12.2 \text{ ma}.$$

Given resistance values such as have just been herein determined, the illustrative detector circuit provides a low output when the subscriber loop 11 is in the open circuit condition, i.e., station set 10 is in the on-hook state. In that condition, no loop current $I_{Loop}$ is drawn from the supply 20 in the loop 11. However, the current drawn by the diode 41 develops a voltage $V_z$ that biases the previously described resistance bridge so that the noninverting input of comparator 30 is more negative than the level at which the bridge would otherwise place it, i.e., approximately equal to the inverting input level. Hence, the detector circuit output at terminals 18 and 19 has the aforementioned low output level. Various spurious interference and leakage signals can produce both longitudinal and loop current in the subscriber loop 11. However, the longitudinal component is balanced out at the inputs to comparator 30 and has no effect on its output. The interference and leakage loop component of unpredictable polarity, has been found, on the basis of empirical measurements, normally to be of insufficient magnitude to overcome the aforementioned bridge bias due to diode 41 and provide a false indication of loop status.

When the subscriber station 10 goes off-hook, loop 11 is closed in the usual fashion for such stations; and loop current $I_{Loop}$ flows, as indicated in the drawing, in a counteclockwise direction in loop 11. This current flow, in sensing resistor 21, tends to drive the noninverting input of comparator 30 in a positive-going direction; and the same loop current in sensing resistor 22 tends to drive the inverting connection of comparator 30 in a negative-going direction with respect to ground. These effects are sufficient, in response to the previously noted minimum or threshold loop current for the loop closed condition, to overcome the bias due to the presence of diode 41 and reverse the polarity of the voltage difference at the inputs to comparator 30. Consequently, upon that reversal, the output of the comparator output is stepped to its second, or higher, value to indicate loop closure.

An experimental detector employing one percent tolerance resistors having values such as those hereinbefore illustratively determined produced only about one percent increase in $I_{Thresh}$ in response to a 100% increase in the voltage of supply 20. The lowest longitudinal rejection signal was 130 ma. (approximately five times larger than the largest signal current usually required to be rejected at about 11.8 ma. for $I_{Loop}$. Even higher longitudinal signals were rejected at higher and lower values of $I_{Loop}$ in a loop current range from 0 ma. to 41.6 ma.

Although the invention has been described in connection with a particular embodiment thereof, it is to be understood that additional embodiments, modifications, and applications, which will be obvious to those skilled in the art, are included within the spirit and scope of the invention.

What is claimed is:

1. A loop circuit current detector including a coupling network for applying detector input signals to a comparator, said coupling network including a bridge circuit, and said detector being characterized in that there are provided
    means for balanced said bridge circuit,
    means for imposing a predetermined offset bias on an input terminal of said comparator, and
    means, responsive to detector input signals, for biasing said comparator input terminal in opposition to said offset bias.

2. The detector in accordance with claim 1 in which said coupling network comprises
    means for receiving a supply voltage for a loop circuit and said detector, and means for applying said supply voltage to both inputs of said comparator by paths of approximately equal attenuation.

3. The detector in accordance with claim 1 in which said imposing means comprises a reverse breakdown diode having a breakdown voltage corresponding to detector input signals representing a loop circuit predetermined minimum current which is sufficient to indicate loop circuit closure.

4. The detector in accordance with claim 3 in which means are provided for receiving a supply voltage for said loop circuit and for said detector, and
said imposing means further comprises
a resistance in series with said reverse breakdown diode between a first input of said comparator and said supply voltage, and
a resistance connected from a common terminal in the series connection of the first-mentioned resistance and said diode to said supply voltage for assuring sufficient bias to said diode to maintain such diode in its reverse conduction condition within the full range of anticipated detector input signals.

5. The detector in accordance with claim 1 in which means are provided for receiving a supply voltage for a loop circuit and said comparator,
said coupling network includes at least one resistor in series with said loop circuit and said supply voltage receiving means for developing a potential difference proportional to the magnitude of a current flowing in said loop circuit, and
said imposing means comprises means connected between one side of said supply voltage receiving means and an input of said comparator, which is also connected to said loop series resistor, for developing a potential difference approximately equal and opposed, with respect to said comparator input, to the potential difference across the last-mentioned resistor when a predetermined minimum loop current is present.

6. A current level detector comprising
means for receiving a predetermined supply voltage,
a pair of terminals at which detector input voltages are produced to indicate current-level-responsive information regarding input signals to said detector,
means for biasing said pair of terminals to approximately the same voltage, the voltage difference between said terminals being independent of said supply voltage,
means, in said biasing means, and responsive to current level of said input signals to said detector, for modifying the voltage difference between said terminals in a first predetermined direction by an amount corresponding to said current level, and
means, responsive to said supply voltage, for applying an offset bias to at least one of said terminals to modify the voltage difference between said terminals in a second predetermined direction by a predetermined amount which is independent of both said input current level responsive signals and said supply voltage.

7. The detector in accordance with claim 6 in which said terminal pair biasing means comprises
a resistance bridge,
means for connecting said supply voltage from said receiving means across a first diagonal of said bridge, and
means for connecting said terminal pair across a second diagonal of said bridge.

8. The detector in accordance with claim 6 in which said terminal pair biasing means comprises
first and second approximately equal attenuation paths connected for applying said supply voltage to said pair of terminals.

9. The detector in accordance with claim 6 in which said modifying comprises
means, responsive to said input signals, for developing a voltage, at the comparator inputs, approximately equal and opposite to said offset bias to indicate a predetermined level of said input signal current.

10. The detector in accordance with claim 6 in which said modifying means comprises
means, including said terminal biasing means, for presenting to each terminal of said pair impedance combinations of approximately equal resistance.

11. The detector in accordance with claim 6 in which said modifying means comprises
means, including said terminal biasing means, for subjecting said input signals to approximately equal transfer functions.

12. The detector in accordance with claim 6 in which said offset bias applying means comprises
a reverse breakdown diode connected to couple supply voltage to said one terminal and having a reverse breakdown conduction voltage drop of approximately the same magnitude as said predetermined amount.

* * * * *